J. CORRISTON.
Car Spring.
No. 83,043.
Patented Oct. 13, 1868.
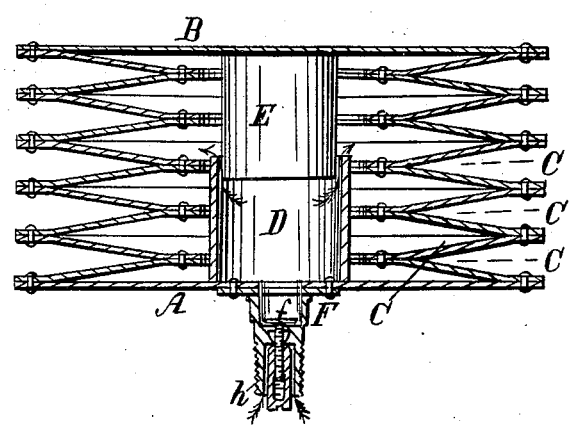

JACKSON CORRISTON, OF SANDUSKY CITY, OHIO.

Letters Patent No. 83,043, dated October 13, 1868.

IMPROVED AIR-SPRING.

The Schedule referred to in these Letters Patent and making part of the same.

*To all whom it may concern:*

Be it known that I, JACKSON CORRISTON, of Sandusky City, in the county of Erie, and State of Ohio, have invented a new and useful Improvement in Air-Springs; and I do hereby declare that the following is a full, clear, and exact description thereof, which will enable others skilled in the art to make and use the same, reference being had to the accompanying drawings, forming part of this specification.

My invention relates to improvements in air-springs for use on railroad-cars, or for any other purpose for which they may be found useful.

It consists of springs composed of a series of concave perforated sheet-metal diaphragms, arranged in pairs reversely to each other, united together alternately at their outer and inner edges, and joined together at each end to concentric disks, and provided with an interior guiding-tube, secured to one end, and a plunger secured to the other end, which works in the said guiding-tube, the two serving as a guide for the proper action of the spring when in use, and to prevent a collapse of the same if an opening should occur through which the air should escape.

It is also provided with a valve for admitting air, and for closing to prevent the escape of the air after the spring has been filled, as will be more fully described on reference to the accompanying drawing, wherein the figure shows a central vertical section of my improved springs.

A and B represent the ends, which consist of plain disks of sheet-metal, the former being perforated, for communication with a tube and air-valve for filling the springs.

C C represent a series of concave diaphragms, having large central openings arranged together reversely in pairs, so as to be joined together alternately at their outer and inner edges, as shown in the drawings, the outer diaphragms on each end being joined, by their outer edges, to the disks A and B.

On the inner edge of the disk A, a hollow cylinder, D, is secured, and on the inner end of the disk B, a cylindrical plunger, E, is secured, the purpose of which is to serve as a guide while the spring is in action, and to prevent the same from collapsing if the air should escape.

F represents an air-pipe, provided with a valve, *f*, having a hollow nut, *g'*, screwed on to its stem, which may, after the spring has been filled with compressed air, be screwed up tight in the socket *h* of the tube, and soldered or otherwise made permanently tight.

I claim as new, and desire to secure by Letters Patent—

An air-spring, constructed as herein described, and provided with the valve *f*, in combination with the spring A B, composed of metallic disks, substantially as and for the purpose set forth.

JACKSON CORRISTON.

Witnesses:
WM. GEASEN,
GEORGE SORGEL.